(12) United States Patent
Koehl et al.

(10) Patent No.: US 8,935,685 B2
(45) Date of Patent: *Jan. 13, 2015

(54) INSTRUCTION SCHEDULING APPROACH TO IMPROVE PROCESSOR PERFORMANCE

(75) Inventors: Juergen Koehl, Boeblingen (DE); Jens Leenstra, Boeblingen (DE); Philipp Panitz, Boeblingen (DE); Hans Schlenker, Frankfurt (DE)

(73) Assignee: International Business Machines Corporation, Armonk, NY (US)

( * ) Notice: Subject to any disclaimer, the term of this patent is extended or adjusted under 35 U.S.C. 154(b) by 228 days.

This patent is subject to a terminal disclaimer.

(21) Appl. No.: 13/459,128

(22) Filed: Apr. 28, 2012

(65) Prior Publication Data

US 2012/0216016 A1 Aug. 23, 2012

Related U.S. Application Data

(63) Continuation of application No. 13/105,024, filed on May 11, 2011.

(30) Foreign Application Priority Data

May 19, 2010 (EP) .................................... 10163205

(51) Int. Cl.
*G06F 9/45* (2006.01)
*G06F 9/38* (2006.01)
*G06F 17/50* (2006.01)

(52) U.S. Cl.
CPC ............ *G06F 9/3855* (2013.01); *G06F 17/505* (2013.01); *G06F 2217/68* (2013.01)
USPC .............................. 717/161; 717/153; 717/159

(58) Field of Classification Search
None
See application file for complete search history.

(56) References Cited

U.S. PATENT DOCUMENTS 5,664,193 A * 9/1997 Tirumalai ..................... 717/153
5,835,776 A * 11/1998 Tirumalai et al. ............. 717/161
(Continued)

OTHER PUBLICATIONS

Li et al., "Hardware-Software Co-Design of Embedded Reconfigurable Architectures," 2000, DAC '00 Proceedings of the 37th Annual Design Automation Conference, pp. 507-512.*
(Continued)

*Primary Examiner* — Thuy Dao
*Assistant Examiner* — Stephen Berman
(74) *Attorney, Agent, or Firm* — Margaret McNamara, Esq.; Blanche E. Schiller, Esq.; Heslin Rothenberg Farley & Mesiti P.C.

(57) ABSTRACT

A processor instruction scheduler comprising an optimization engine which uses an optimization model for a processor architecture with: means to generate an optimization model for the optimization engine from a design of a processor and data representing optimization goals and constraints and a code stream, wherein the processor has at least two execution pipes and at least two registers, and wherein the design comprises data for processor instruction latency and execution pipes, and wherein the code stream comprises processor instructions with corresponding register selections; and reordering means to generate an optimized code stream from the code stream with the optimal solution provided by the optimization engine for the optimization model by reordering the code stream, such that optimum values for the optimization goals under the given constraints are achieved without affecting the operation results of the code stream.

3 Claims, 9 Drawing Sheets

(56) References Cited

U.S. PATENT DOCUMENTS

| | | | |
|---|---|---|---|
| 6,871,343 B1* | 3/2005 | Yoshikawa | 717/161 |
| 7,162,617 B2 | 1/2007 | Ota et al. | |
| 7,530,062 B2* | 5/2009 | Aronson et al. | 717/159 |
| 7,631,305 B2 | 12/2009 | Rong et al. | |
| 8,141,067 B2* | 3/2012 | Brokenshire et al. | 717/159 |
| 2003/0188299 A1* | 10/2003 | Broughton et al. | 717/141 |
| 2003/0208723 A1 | 11/2003 | Killian et al. | |
| 2004/0073899 A1 | 4/2004 | Luk et al. | |
| 2005/0071825 A1* | 3/2005 | Nagaraj et al. | 717/142 |
| 2005/0097509 A1 | 5/2005 | Rong et al. | |
| 2005/0108687 A1* | 5/2005 | Mountain et al. | 717/127 |
| 2005/0216900 A1* | 9/2005 | Shi et al. | 717/161 |
| 2008/0034360 A1 | 2/2008 | Bodin et al. | |
| 2008/0120493 A1 | 5/2008 | Yoo et al. | |
| 2008/0168258 A1 | 7/2008 | Armstrong et al. | |
| 2008/0169842 A1 | 7/2008 | Gemmeke et al. | |
| 2008/0270972 A1* | 10/2008 | McCool et al. | 717/104 |
| 2009/0138864 A1* | 5/2009 | Tal et al. | 717/161 |
| 2009/0217252 A1 | 8/2009 | Aronson et al. | |
| 2009/0235241 A1 | 9/2009 | Luk et al. | |
| 2010/0095286 A1 | 4/2010 | Kaplan | |
| 2010/0115501 A1 | 5/2010 | Partridge et al. | |
| 2010/0122242 A1 | 5/2010 | Jiva | |
| 2011/0265057 A1 | 10/2011 | Lee et al. | |
| 2011/0289297 A1 | 11/2011 | Koehl | |
| 2013/0339935 A1* | 12/2013 | Melamed | 717/153 |

OTHER PUBLICATIONS

Moudgill et al., "Register renaming and dynamic speculation: an alternative approach," 1993, MICRO 26 Proceedings of the 26th annual international symposium on Microarchitecture, pp. 202-213.*

Tiwari et al., "Reducing power in high-performance microprocessors," 1998, DAC '98 Proceedings of the 35th annual Design Automation Conference, pp. 732-737.*

Atasu, Kubilay et al., "Optimizing Instruction-set Extensible Processors under Data Bandwidth Constraints," May 29, 2007, pp. 588-593.

Office Action for U.S. Appl. No. 13/105,024 dated Jan. 27, 2014, pp. 1-25.

Office Action for U.S. Appl. No. 13/105,024 dated May 15, 2014, pp. 1-28.

* cited by examiner

```
<1,"sigma",{"v8"},{"v0"}>,
<2,"vsel",{"v6"},{"v1","v2","v0"}>,
<3,"pm",{"v9"},{"v3","v3'"}>,
<4,"pm",{"v12"},{"v3","v8"}>,
<5,"vsel",{"v7"},{"v0","v1","v6"}>,
<6,"pm",{"v10"},{"v6","v6"}>,
<7,"add",{"v13"},{"v9","v5"}>,
<8,"pm",{"v11"},{"v7","v0"}>,
<9,"add",{"v14"},{"v8","v13"}>,
<10,"add",{"v15"},{"v10","v12"}>,
<11,"add",{"v16"},{"v11","v14"}>,
<12,"add",{"v0"},{"v16","v15"}>,
```
40

```
<"sigma",1,{"p0","p1"}>,
<"vsel",3,{"p1"}>,
<"pm",1,{"p0","p1"}>,
<"add",3,{"p0","p1"}>,
```
45

Fig. 4

| p0 | p1 |
|---|---|
| sigma v8 v0 | vsel v6 v1 v2 v0 |
|  | pm v9 v3 v3 |
|  | pm v12 v3 v8 |
|  | vsel v7 v0 v1 v6 |
| add v13 v9 v5 | pm v10 v6 v6 |
|  |  |
| add v14 v8 v13 | pm v11 v7 0 |
| add v15 v10 v12 |  |
|  |  |
| add v16 v11 v14 |  |
|  |  |
| add v0 v16 v15 |  |
|  |  |
| sigma v8 v0 | vsel v6 v1 v2 v0 |

Fig. 5

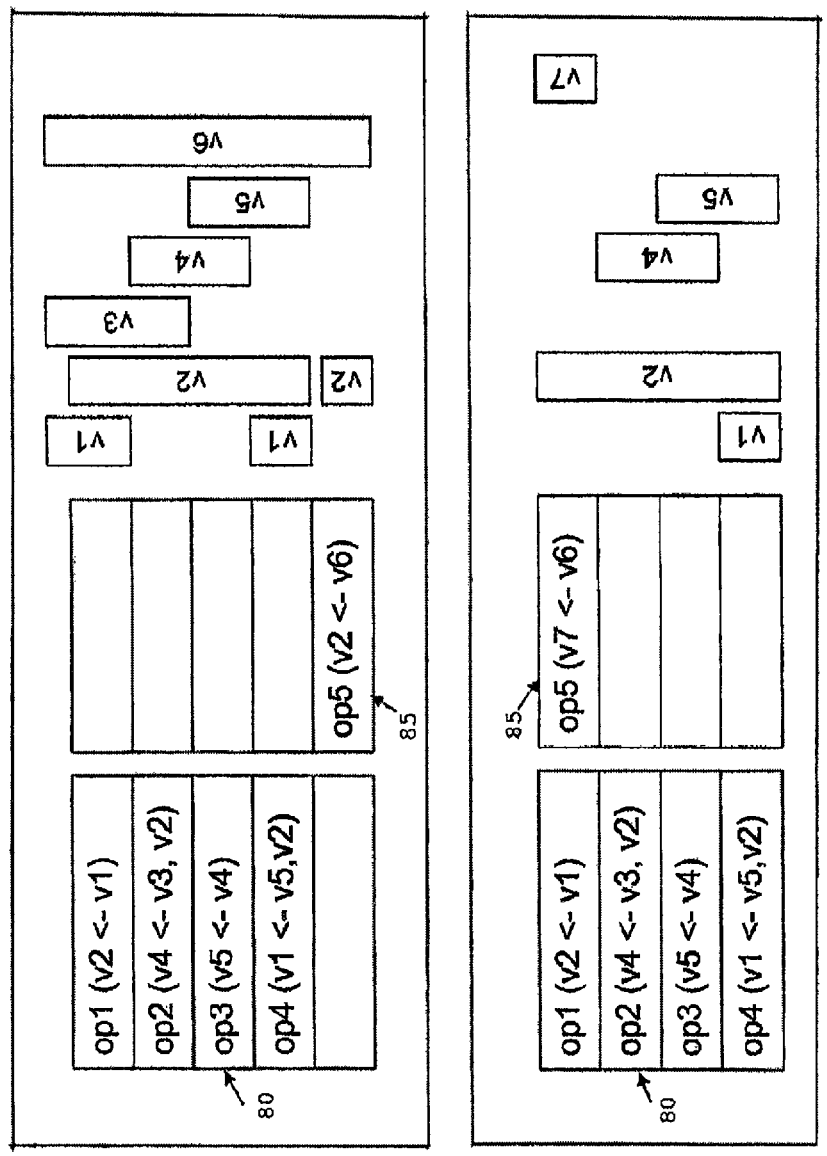

INSTRUCTION SCHEDULING APPROACH TO IMPROVE PROCESSOR PERFORMANCE

This application is a continuation of U.S. Ser. No. 13/105,024, entitled "AN INSTRUCTION SCHEDULING APPROACH TO IMPROVE PROCESSOR PERFORMANCE," filed May 11, 2011, which claims priority from European patent application number 10163205.7, filed May 19, 2010, each of which is hereby incorporated herein by reference in its entirety.

BACKGROUND

Aspects of the present invention relate to the design of processors and a processor instruction scheduler as a design automation tool.

State of the art processors comprise a large number of units such as cores, processing units or accelerators. Often so-called execution units are used to execute special instructions. Out-of-order superscalar processors use inherent instruction level parallelism to do the speculative and parallel execution of multiple instructions each cycle on multiple execution units in order to improve the instruction throughput. Such out-of-order processors typically have an instruction sequencing unit (ISU) for scheduling the execution of an instruction on the multiple execution units as part of the processor each cycle. In addition the ISU takes care by a so-called commit process that speculative execution results will become architected state according to the order of the program code stream. Area, power and timing constraints put constraints on the ISU instruction scheduling heuristics. For example, the instruction queue with its associated rename and dependency checking will have a certain queue depth. Queues are often split based on execution units and so on, limiting the number of instructions in the code stream that the ISU is able to take into account for scheduling the instruction onto multiple execution units. Hence, the order in which instructions are sent to the ISU matters.

A wrong ordering of the processor instructions in the code stream can lead to some units running empty while others are overloaded and the instructions queued up for the overloaded units are blocking processor instructions that could be executed on other units. In some cases the available processor registers limit the number of processor instructions that can be handled by the processor simultaneously. All these variables differ between processor families or even between different generations of the same processor family. General purpose compilers cannot be expected to produce optimized code for each situation as they need to be able to compile large software packages in an acceptable time.

Another issue is that during the definition of the processor architecture, basic decisions have to be made about the units and instructions:
- Which accelerators will be implemented (performance vs. hardware tradeoffs)?
- Which processor instructions and how many execution units are supported?
- What is a suitable pipeline depth for the execution in a certain unit?

For example, in K. Atasu et al "Optimizing Instruction-set Extensible Processors under Data Bandwidth Constraints", Proc. of the Conference on Design, Automation and Test in Europe, pp. 588-593, 2007, which is hereby incorporated herein by reference in its entirety, the use of linear programming to identify custom instructions is described. Here groups of processor instructions are identified that can be combined to be executed by hardware accelerators.

The alternatives in the design of a processor are usually tested with a code stream that may not be in the optimal order for the given configuration. The respective work flow is shown in FIG. 1: High level code I1, which implements an algorithm, is used as input for a compiler and compiled in step S1, which results in a code stream I2, for example in form of assembler code. The compiler uses heuristics to schedule the processor instructions in the code stream I2. After the generation of machine code from the code stream I2, which comprises of direct processor instructions, it will then be used as input of a processor and will be executed by the processor in step S2.

While it is very time consuming to re-order the code stream for each alternative manually, there is also no guarantee that optimal performance is reached. Also for critical loops in software, their corresponding machine code will be manually rewritten in case of performance problems for existing processors. This requires in depth knowledge of the processor hardware implementation, for example of the instruction scheduling in the processor. Some compilers also offer to automatically instrument the code stream such that profiling information is generated during the execution of the code stream, which is used to gather statistics. This allows the compiler to use the data from the statistics for optimizations in subsequent compilation runs when generating a code stream.

BRIEF SUMMARY

According to one embodiment of the present invention, a method to select a design from at least two different designs of a processor with at least two execution pipes and at least two registers is provided. The method includes, for instance, generating, by a processor, an optimized code stream for each design of the at least two different designs, wherein the at least two different designs include data for processor instruction latency and execution pipes, and wherein a code stream of processor instructions with corresponding register selections is provided for each design respectively, wherein the generating includes reordering a corresponding code stream such that an optimum value for at least one design parameter is achieved without affecting operation results of the corresponding code stream; and selecting a design with the best optimum value for the respective optimized code stream.

BRIEF DESCRIPTION OF THE SEVERAL VIEWS OF THE DRAWINGS

FIG. 4 depicts one embodiment of a block diagram illustrating an example code stream and library, in accordance with an aspect of the present invention;

FIG. 5 depicts one embodiment of a block diagram illustrating the scheduling of instruction pipes for the example code stream of FIG. 4, in accordance with an aspect of the present invention;

FIG. 8 depicts one embodiment of a block diagram illustrating the processor register usage of the example code stream of FIG. 6 in a processor with two execution pipes, in accordance with an aspect of the present invention;

FIG. 9 depicts one embodiment of a block diagram illustrating the processor register usage of an optimized version of the example code stream of FIG. 6 in a processor with two execution pipes, in accordance with an aspect of the present invention;

DETAILED DESCRIPTION

Figure 1:
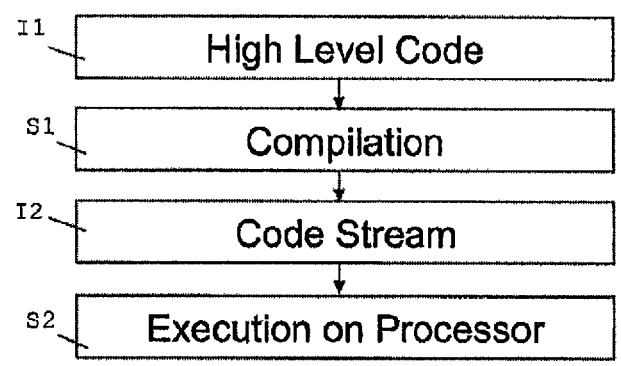
FIG. 1 depicts one example of a flow diagram of a state of the art work flow.
Figure 2:
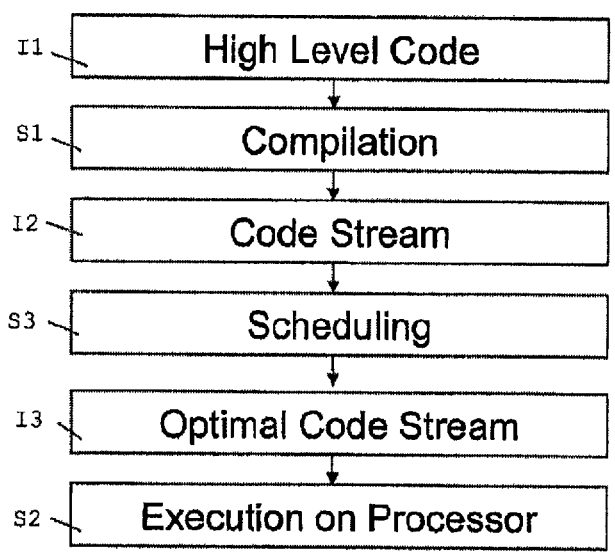
FIG. 2 depicts one example of a flow diagram illustrating a work flow, in accordance with an aspect of the present invention.

According to an aspect of the invention, the state of the art work flow of FIG. 1 is adapted as shown in FIG. 2. The code stream I2 will be optimized by an instruction scheduler in step S3, which results in an optimized code stream I3. The optimized code stream I3 will then be executed on the processor in step S2.

Figure 3:
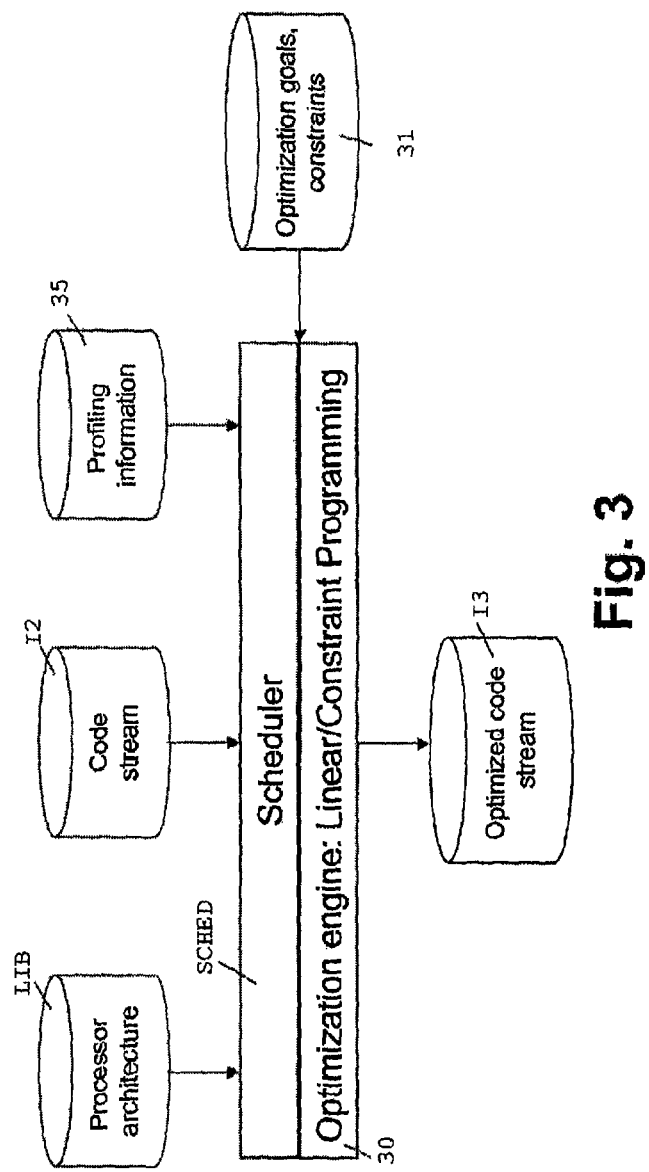
FIG. 3 depicts one example of a block diagram illustrating a development setup, in accordance with an aspect of the present invention.

As shown in FIG. 3, a library LIB with information of at least two different processor designs is provided and used by the scheduler SCHED. The scheduler SCHED comprises an optimization engine 30, which uses linear and constraint programming methods. The optimization engine uses optimization goals and constraints as input 31. Such optimization goals and constraints are for example to minimize power consumption, to maximize processor performance and to constrain register numbers. The processor model used by optimization engine 30 includes, for instance:

Available instructions, execution time for each instruction, input and output registers;

The units that can be used for each instruction: Different execution time, power consumption on different units or accelerators can be defined as well as performance vs. power trade offs; and The available registers for storing of intermediate results and the time it takes after execution of an instruction for the register to become valid.

This model of the processor architecture and the code stream I2 will be used by the optimization engine 30 for a mathematical model including, for instance:

Decision variables (e.g. on which unit and in which cycle an instruction is executed as well as the input and output registers used);

The constraints to guarantee the correct execution of the code stream (e.g. only one active instruction on each unit at a time, sufficient time for registers to become valid); and The function to be optimized: minimizing the total execution time of the code stream.

The mathematical model is described in an optimization programming language and an appropriate solver is used to generate a solution. In one example, a solution includes valid values for the decision variables that satisfy all of the constraints and minimize or maximize the target function. If such solution exists, it is an optimal solution.

Optionally, the scheduler SCHED may also use profiling information 35, which was generated by actual runs of the code stream I2 on a processor. The library LIB comprises a detailed description of the processor instruction set for each processor design. It states which processor instruction is allowed to be executed on which execution unit of the processor. The execution units typically have different latencies from instruction issue to the write back of the results of the instruction processing.

For one embodiment of the invention, the code stream I2 includes instructions with multiple source registers and one target register. Processor instructions have one target register even though the number of input registers may vary. There are different classes of instructions that can use different registers to pull the operands from and write the result back to. The processor comprises at least two execution units for the processing of the instructions. Each of the execution units has an execution pipeline for the instructions to be processed.

The code stream I2 and the processor design information contained in the library LIB are specific for a certain processor instruction set. FIG. 4 shows an example code stream 40 and an example library 45. The code stream 40 includes 12 instructions. For example, the first instruction in the code stream 40 is a "sigma" instruction and uses the processor register v8 as its output register, and the processor register v0 as its only input register. The fifth instruction is a "vsel" instruction and uses v7 as its output register, and v0, v1, v6 as its input registers.

The code stream 40 includes four different instruction types: "sigma", "vsel", "pm" and "add". The example library 45 contains the corresponding latency and execution pipes in its library information. For example, the "vsel" instruction has a latency of 3 processor cycles and can only use execution pipe p1 of the processor, whereas the other instructions can use also execution pipe p0.

FIG. 5 shows an example how the scheduler SCHED schedules the instructions of the code stream 40 to the two execution pipes p0 and p1 of the processor in the following sequence:

instruction 1 and 2 are assigned in parallel to p0 and p1 respectively;

instructions 2 to 5 are assigned in sequence to p1, while no instruction is assigned to p0;

instructions 6 and 7 are assigned in parallel to p1 and p0 respectively;

no instructions are assigned to either p0 and p1;

instructions 8 and 9 are assigned in parallel to p1 and p0 respectively;

instruction 10 is assigned to p0, while no instruction is assigned to p1;

no instructions are assigned to either p0 and p1;

instruction 11 is assigned to p0, while no instruction is assigned to p1;

no instructions are assigned to either p0 and p1;

instruction 12 is assigned to p0, while no instruction is assigned to p1.

Figure 6:
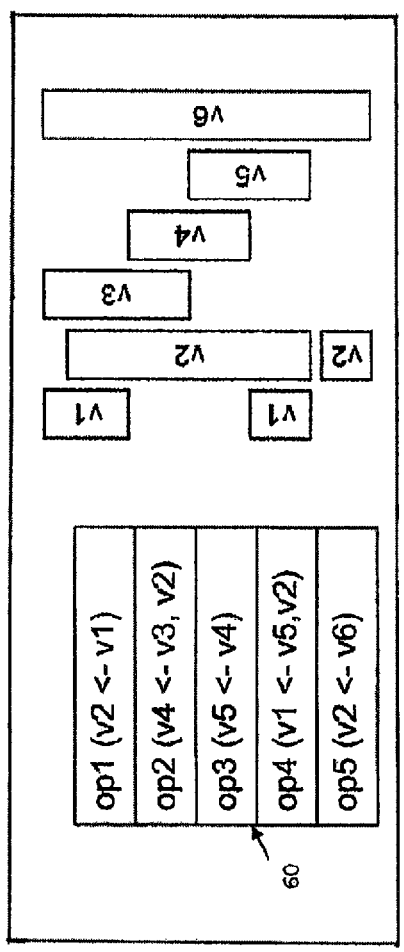
FIG. 6 depicts one embodiment of a block diagram illustrating the processor register usage of an example code stream, in accordance with an aspect of the present invention.
Figure 7:
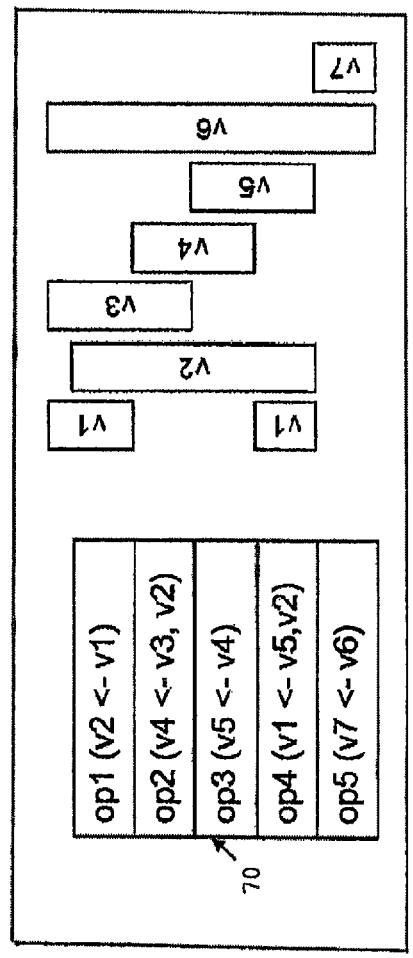
FIG. 7 depicts one embodiment of a block diagram illustrating the processor register usage of an optimized version of the example code stream of FIG. 6, in accordance with an aspect of the present invention.

FIG. 6 shows a simplified code stream 60 with a sequence of five different instructions op1 to op5 using processor registers v1 to v7. The corresponding Gantt chart shown in FIG. 6 indicates which instructions of the code stream 60 use which of the processor registers v1 to v6. The use of register v2 in instruction op5 implies that op5 cannot be executed in parallel with op1 through op4. But op5 has v6 as input register and v2 only as output register so that it does not need the content of register v2. Therefore, op5 can use a different free register. FIG. 7 shows an optimized code stream 70 for the code stream 60 together with a corresponding Gantt chart.

Instruction op5 now uses the free register v7. This allows op5 to be executed in parallel with op1 to op4. This approach is known as register renaming.

A parallel execution requires a second execution pipe. This is shown for the code stream 60 in FIG. 8 with execution pipes 80 and 85 and a corresponding Gantt chart, wherein vertical bars indicate the usage of processor registers throughout the processing of the instructions. In FIG. 8 it is assumed, that op1 to op4 can be processed on pipe 80 and op5 on pipe 85 only. Then the execution of the code stream 60 requires 5 processor cycles. FIG. 9 shows the situation for the optimized code stream 70 instead. Since op5 can be executed in parallel to op1 to op4, the optimized code stream 70 requires 4 processor cycles only due to the register renaming.

In one embodiment of the invention, the optimization engine 30 is the IBM LOG CP product, which uses a so-called optimization programming language (OPL). A mathematical optimization program written in OPL defines decision variables that:

(a) assigns each processor instruction to an execution unit;
(b) assigns a specific processor cycle for each processor instruction;
(c) assigns the output register to store the result of each processor instruction.

Next the constraints that limit the choice of the decision variables are defined such that:

(d) to each execution unit only a certain number of processor instructions (e.g. one) can be sent for execution each cycle;
(e) a processor instruction can only be executed if the required input is available and valid as it takes a certain number of processor cycles for a result to become valid after the corresponding processor instruction was executed;
(f) a processor register may not be used again as an output as long as there are outstanding processor instructions that need the current data in the register;
(g) an execution unit is able to execute a certain type of processor instruction;
(h) a processor register is available to store the output of a certain type of processor instruction.

Finally, the target function to be optimized is specified. Examples are:

(i) total duration to execute a given code stream;
(j) power consumption in the case that a power consumption is given for each instruction/units combination;
(k) any combination of i and j.

Each processor instruction in a code stream is modeled as an interval with a start and an end time. For each processor instruction all the dependent instructions in the code stream are determined that use the result of the instruction as an input and a "spanning interval" is defined by the start point of the instruction and the end point being the maximum of the end points of all the dependent instructions. Constraints (e) and (f) are modeled by (f') assigning overlapping spanning intervals to different processor registers.

The optimization engine 30 will then assign values to the decision variables (a, b, c) that satisfy constraints (d to h) and provide an improved or even optimal value for the given target function (i or j or k). This allows the scheduler SCHED to generate an optimized code stream I3 for a given code stream I2. The processor instructions in the code stream I2 are assigned to the execution units of the processor such that overlaps in the register usage are avoided. The determined solution is then put into a linear sequence of processor instructions again in order to form the optimized code stream I3.

The following OPL code skeleton illustrates an implementation for the optimization model that is processed by the optimization engine 30:

```
// Objective: Minimize runtime
minimize max(i in program) endOf(pipeTask[i]);
// Constraints: Instructions=tasks
subject to {
// alternative execution: pipeTask[i] on either pipe
forall (i in program)
ctAltPipe:
alternative(pipeTask[i],all(a in pipeAssigns: a.i==i)
        pipeAssign[a]);
// options for task execution
// alternative usage: regTask[rt] on either register
forall (rt in newRegTasks)
ctAltReg:
alternative(regTask[rt],all(a in regAssigns: a.rt==rt)
        regAssign[a]);
// on each pipe: sequential execution
// tasks do not overlap
forall (p in pipes)
ctSequPipe:
noOverlap(pipeSequ[p]);
// on each register: sequential usage
forall (r in registers)
ctSequReg:
noOverlap(regSequ[r]);
// registers are used by only one task at the same time
// respect dependencies wrt register writing and reading and
// delay of preceding op
// note that coverRegTasks rt is used here: each of them
// represents a dependency between rt.startI and rt.coverI
if (pipeSwitchDelay <= 0)
forall (rt in coverRegTasks : rt.startI > botI)
ctDependencies:
startBeforeStart(pipeTask[mapI[rt.startI]],
        pipeTask[mapI[rt.coverI]],
        mapI[rt.startI].op.delay);
// tasks dependend on other task - no start before other start
// different architectures
if (pipeSwitchDelay > 0)
forall (rt in coverRegTasks, as in pipeAssigns,
    ac in pipeAssigns : rt.startI>botI &&
        as.i.id==rt.startI && ac.i.id==rt.coverI)
ctDependenciesSwitch:
if (as.p==ac.p)
startBeforeStart(pipeAssign[as],pipeAssign[ac],as.i.op.delay);
else
startBeforeStart(pipeAssign[as],pipeAssign[ac],
        as.i.op.delay+pipeSwitchDelay);
// Initialization
// initially set registers: regTask to start at 0
forall (rt in newRegTasks : rt.startI == botI)
ctRegStart0:
startOf(regTask[rt]) == timeStart;
// connect instruction tasks with register tasks:
// register writing
// tasks have an execution time
forall (rt in newRegTasks : rt.startI > botI)
ctRegWriting:
startAtStart(pipeTask[mapI[rt.startI]],regTask[rt],
        mapI[rt.startI].op.delay);
// connect instruction tasks with register tasks:
// register reading
// tasks dependend on other task - start after other ends
forall (rt in coverRegTasks)
ctRegReading:
endBeforeEnd(pipeTask[mapI[rt.coverI]],
        regTask[<rt.reg,rt.startI,botI>]);
}
```

Figure 10:
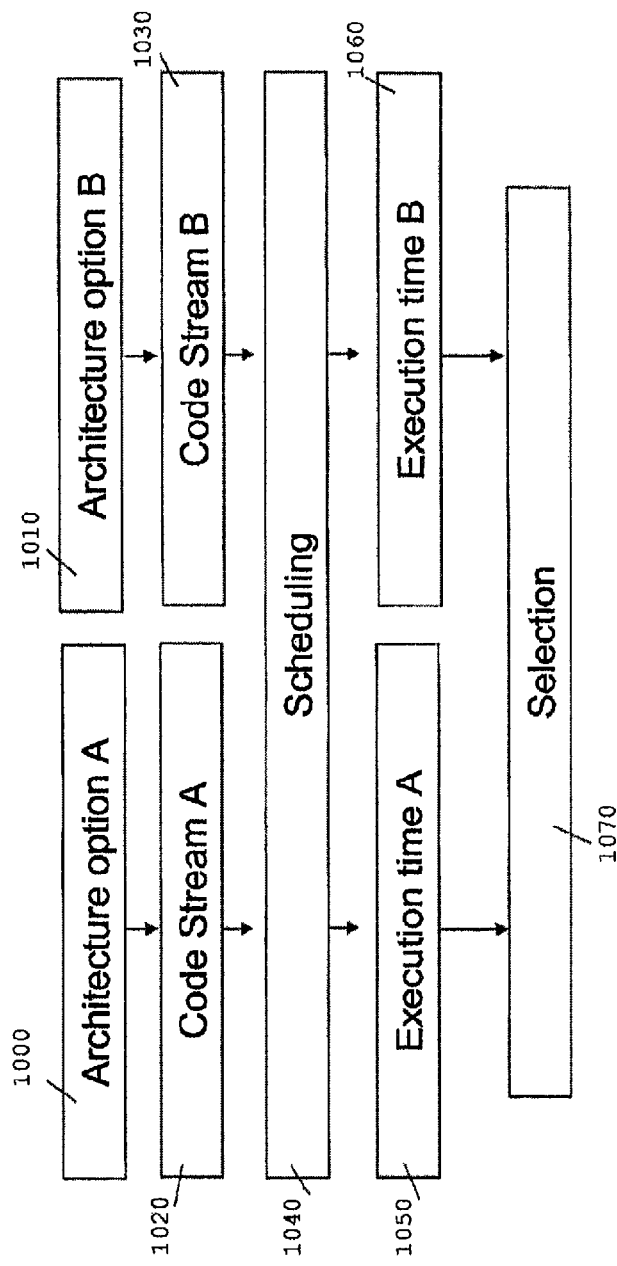
FIG. 10 depicts one embodiment of a block diagram illustrating the selection of a processor design from two alternatives, in accordance with an aspect of the present invention.

FIG. 10 illustrates the selection of a processor design from two alternative architecture design options 1000 and 1010. For design option 1000 a code stream 1020 is provided as well as for design option 1010 a code stream 1030 is provided. In the scheduling step 1040 optimized code streams are generated for the code streams 1020 and 1030 and the respective execution times 1050 and 1060 are determined. Then in step 1070 the design option is selected, which needs fewer processing cycles than the other design option.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 11:
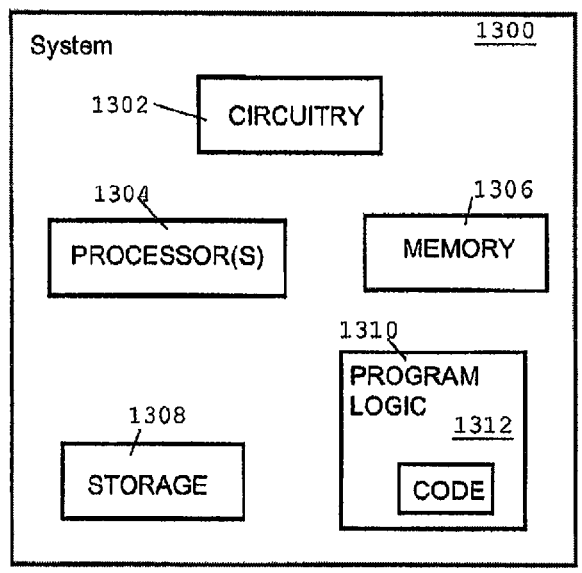
FIG. 11 depicts one embodiment of a block diagram of a system in which certain embodiments may be implemented, in accordance with an aspect of the present invention.

FIG. 11 illustrates a block diagram of a computer system 1300 in which certain embodiments may be implemented. The system 1300 may include a circuitry 1302 that may in certain embodiments include a microprocessor 1304. The computer system 1300 may also include a memory 1306 (e.g., a volatile memory device), and storage 1308. The storage 1308 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 1308 may comprise an internal storage device, an attached storage device and/or a network accessible storage device. The system 1300 may include a program logic 1310 including code 1312 that may be loaded into the memory 1306 and executed by the microprocessor 1304 or circuitry 1302. In certain embodiments, the program logic 1310 including code 1312 may be stored in the storage 1308. In certain other embodiments, the program logic 1310 may be implemented in the circuitry 1302. Therefore, while FIG. 13 shows the program logic 1310 separately from the other elements, the program logic 1310 may be implemented in the memory 1306 and/or the circuitry 1302.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method to select a design from at least two different designs of a processor with at least two execution pipes and at least two registers, the method comprising:

Obtaining the at least two different designs of the processor, wherein the at least two different designs each indicate a respective specific processor instruction set architecture having a defined hardware and instruction set thereof, and wherein the at least two different designs comprise data for processor instruction latency and execution pipes;

Obtaining a plurality of code streams, each code stream of the plurality of code streams comprising processor instructions and corresponding register selections, and each code stream of the plurality of codes streams comprising code compiled for a corresponding different design of the at least two different designs of the processor;

generating, by a processor, an optimized code stream for each design of the at least two different designs, the generating being performed for each design based on the defined hardware and instruction set of the design, wherein generating an optimized code stream for a design of the at least two different designs comprises reordering the code stream corresponding to that design such that an optimum value for at least one design parameter is achieved without affecting operation results of the corresponding code stream corresponding to that design, and wherein the generating the optimized code stream for each design of the at least two different designs provides a plurality of optimum values for the at least one design parameter;

selecting a design, from the at least two different designs, for which the best optimum value of the plurality of optimum values for the at least one design parameter is achieved; and wherein the at least one design parameter comprises the number of processing cycles for the optimized code stream, which is minimized for the design in the generating; and wherein the generating uses register renaming.

2. The method of claim 1, wherein the at least one design parameter comprises the power consumption of the processor, which is minimized for the design in the generating.

3. The method of claim 1, wherein a minimal number of used registers is used as a constraint for the generating.

* * * * *